Figure 3:
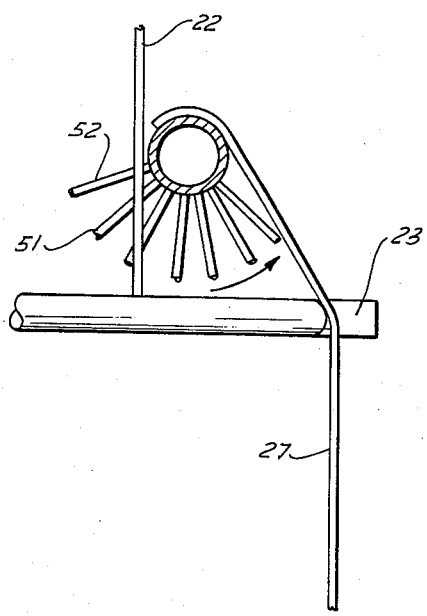

United States Patent [19]
Roffelsen

[11] 3,968,554
[45] July 13, 1976

[54] HEAT EXCHANGER

[75] Inventor: Franciscus Roffelsen, Helmond, Netherlands

[73] Assignee: Naamloze Venootschap Spiro Research N.V., Helmond, Netherlands

[22] Filed: Sept. 5, 1972

[21] Appl. No.: 286,455

Related U.S. Application Data

[62] Division of Ser. No. 56,366, July 20, 1970, Pat. No. 3,703,253.

[52] U.S. Cl. .......................................... 29/157.3 AH
[51] Int. Cl.² ........................................ B23P 15/26
[58] Field of Search ............................ 29/157.3 AH

[56] References Cited
UNITED STATES PATENTS

| | | |
|---|---|---|
| 877,252 | 1/1908 | Stolp ........................... 29/157.3 AH |
| 1,716,743 | 6/1929 | Still ............................. 29/157.3 AH |
| 1,775,555 | 9/1930 | Dorndorf ..................... 29/157.3 AH |
| 1,960,305 | 5/1934 | Emmons et al. ............. 29/157.3 AH |
| 2,308,319 | 1/1943 | Stanton ........................ 29/157.3 AH |
| 3,217,392 | 11/1965 | Roffelsen .................... 29/157.3 AH |

FOREIGN PATENTS OR APPLICATIONS

| | | | |
|---|---|---|---|
| 561,785 | 6/1944 | United Kingdom ......... 29/157.3 AH |

*Primary Examiner*—C. W. Lanham
*Assistant Examiner*—V. K. Rising

[57] ABSTRACT

A heat exchanger having a tubular core around which a helical wire coil is wound, the helix being provided with a reinforcing edge capping wire.

1 Claim, 3 Drawing Figures

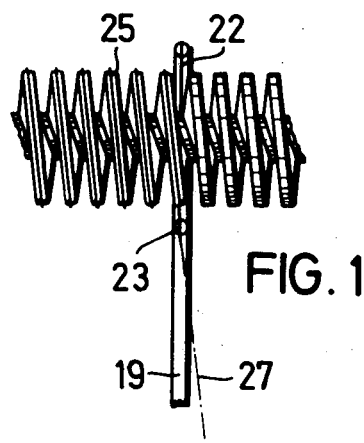
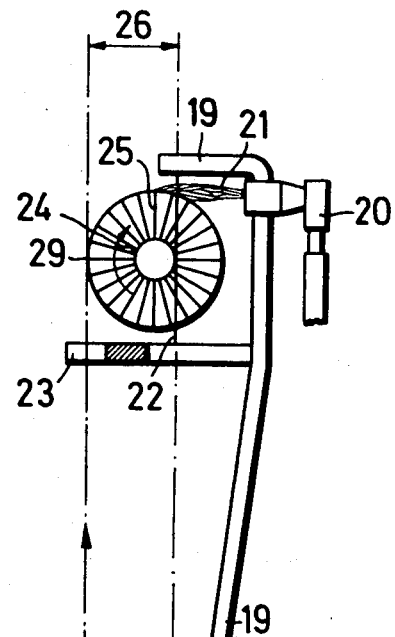
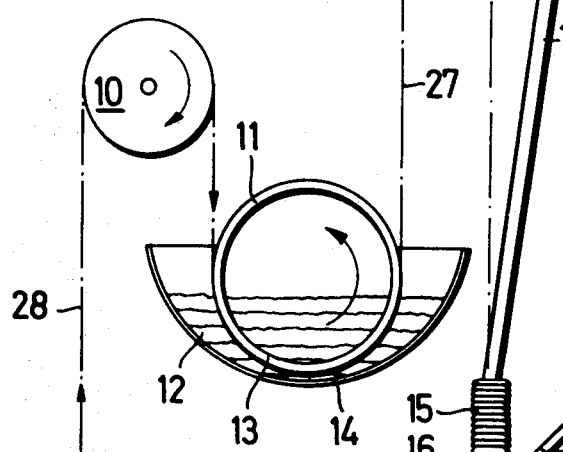
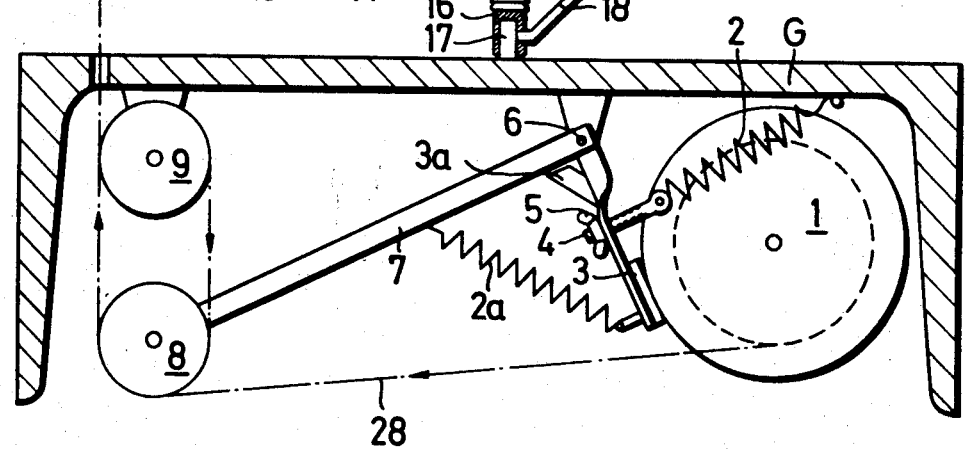

HEAT EXCHANGER

This is a division of application Ser. No. 56,366 filed on July 20, 1970, now U.S. Pat. No. 3,703,253.

The invention relates to a heat exchange consisting of a pipe, for conveying the heat carrier, or for containing the heat source, and a wire coil or helix wound helically on the outside of the pipe (as described in U.S. Pat. No. 3,217,392). In order to obtain the greatest possible heat flux from the heat exchange pipe, which can for example contain an electric resistance, or can convey a liquid heat carrier, to the ambient air or other external medium it has been found advisable to give the wire coil a rectangular or trapezoidal cross section extending as far as possible radially outwards from the pipe, and to use for the wire coil a wire which is as thin as possible. However this brings with it the disadvantage that the wire coil, particularly if it is made of copper, is extremely sensitive to mechanical damage when handled, or even during manufacture, packing and transport, and particularly during assembly and during subsequent operation by the consumer. The wire coil is manufactured and mounted on the central pipe with great precision and if it is subsequently damaged, even over small regions, the performance of the heat exchanges is impaired because the ambient air, flowing energetically over the windings is locally deflected, resulting in locally uneven heat transfer.

The object of the present invention is to provide a heat exchanger of the kind referred to above which is much less sensitive than previous heat exchangers to damage due to mechanically applied forces. The problem is solved by the invention in that a reinforcing capping wire is firmly bonded to the edge of the wire helix, for example by soldering.

Owing to the sensitivity of wire coils made of extremely thin wire to damage by mechanical forces applied to the outer edge of the helix, care must be taken during the manufacture of heat exchangers of this kind, in feeding the edge wire at a suitably low and constant tension to the outer edge of the helix. The wire coil, forming the heat exchanger helix, must not be excessively loaded by the edge caping wire. Starting out from a known process for manufacturing heat exchangers of this kind, in which the central pipe, which supports interrupted lengths of helix, is rotated constantly about its own axis and advanced constantly axially in agreement with the pitch of the helix (as described in U.S Pat. Nos. 3,217,392 and 3,265,276). The invention provides that the edge wire, the end of which is attached to the pipe or to the helix, is fed from a rotatable feeding drum to the edge of the helix under a tension which can be adjusted continuously down to zero tension. The tension of the edge wire must be independent of whether the edge wire is fed to the outer edge of the helix, or to the surface of the heat exchanger pipe.

The invention also includes apparatus for carrying out the method, the apparatus comprising a storage drum for edge capping wire, and having an adjustable brake, and a driving drum which is driven at adjustable speed and which is arranged to dip into a soldering material and to have the edge capping wire wound through at least a half turn around the driving drum so that, in use, the wire is drawn from the storage drum and dipped in the soldering material before passing to a wire guide which is adjustable in position, in use, axially relatively to the heat exchanger pipe for guiding the edge capping wire onto the helix, the edge wire passing from the storage drum to the driving drum around a pair of pulley wheels situated in the same plane and rotating about axes which extend parallel to the axis of the storage drum, the axis of the one pulley wheel being fixed in position, whereas the other pulley wheel is mobile with respect to the first pulley wheel under the influence of an adjustable spring, and is coupled to the brake of the storage drum so that the pulley wheels and brake cooperate to stabilize the tension in the wire.

Preferably, the mobile pulley moves in one direction upon increase in the wire tension, this movement releasing the brake, and vice versa.

The wire guide for guiding the edge wire can for example be arranged in such a way that the wire guide is in the form of the forked end of a guide rod extending perpendicular to the edge wire and to the heat exchanger pipe, the rod being rotatable about an axis which extends parallel to the edge wire and is substantially at a tangent to the exchanger pipe on the opposite side of the exchanger pipe compared to that to which the edge wire is guided.

In the continuous manufacture of heat exchangers of this kind the wire helixs are not formed continuously. To save wire the forming of the helix is interrupted from time to time, leaving a length of pipe without any helix. When a length of helix has been formed the device which forms the wire helix is stopped, so that the wire runs for a certain distance over the surface of the bare heat exchanger pipe. During this interval the edge wire also runs along the bare surface of the pipe. At the beginning of the next helix-forming operation the edge wire must be lifted away from the surface of the pipe to the edge of the helix. To obtain this the guide rod may follow a feeler wire that is stretched taut between the ends of a support rod which carries the guide rod, the feeler wire being arranged to engage the web of the wire helix. The taut feeler wire preferably extends along the axis of rotation of the guide rod, approximately parallel to the edge wire, but on the opposite side of the heat exchanger pipe and in easily deflected, against the influence of a weak spring, at least in the direction of advance of the heat exchanger pipe.

The supporting rod can have a bent end at the top and at its bottom end it can be mounted on the machine housing free to rotate about the axis of the feeler wire, a lock being provided to lock the rod in any desired position. This allows the wire guide at the end of the guide rod to be adjusted in position opposite the edge of the helix, by rotation about the axis of the taut feeler wire. The supporting rod is preferably attached resiliently to a sleeve mounted on a pin projecting upwards from the machine housing so that, on the one hand, the supporting rod can be rotated about the upwardly projecting pin, and locked in position on the pin, and on the other hand could be deflected resiliently away from its axis of rotation.

The production of a heat exchanger in accordance with the inventon is illustrated in the accompanying drawings, in which:

FIG. 1 is a side view of a part of a heat exchanger partly wound, on the left, with the reinforcing edge capping wire and partly, on the right, before adding the reinforcing edge capping wire; and, FIG. 2 shows diagrammatically the apparatus for producing the heat exchanger which is itself shown in cross section as viewed from the right in FIG. 1; and FIG. 3 is a stylized view of the heat exchanger of FIG. 1 and of a portion of an end capping wire incident thereon as viewed from the left in FIG. 1.

A storage drum 1 is mounted replaceably in the lower part of a machine frame G. The storage drum 1 contains a supply of edge capping wire 28 for winding on the radially outer edge 51 (FIG. 3) of successive convolutions 52 of a helically wound wire heat exchanger coil 25 as the coil 25 is rotated on its axis in a clockwise direction as viewed in FIG. 2 or in a counterclockwise direction as viewed in FIG. 3. The tension required to pull the edge wire 28 off the storage drum 1 is adjustable within wide limits by means of a brake 3 of known kind, which is applied to the storage drum 1 by means of a spring 2, a tension screw 4 and a wing nut 5. The braking effect is automatically governed to give the desired variable wire tension where the edge wire 27 is being wound onto the edge of the coiled coil 25. To obtain this automatic regulation of wire tension, a second spring 2a acts on the brake 3 opposing the influence of the first spring 2. The brake lever 3 pivots on a pivot pin 6 the axis of which is parallel to the axis of the storage drum 1. On the pivot pin 6 there is also pivoted a lever 7. The second spring 2a is anchored at one end to the free end of the brake lever 3, the other end of the spring 2a being anchored to the lever 7, so that the spring 2a tends to pull the brake 3 away from the drum 1, the movement of the brake lever 3 being limited by a stop 3a. On the free end of the lever 7 there is a pulley wheel 8 around which the edge wire 28 passes. The pulley wheel 8 cooperates with a second pulley wheel 9 fixed to the machine frame G, the edge wire 28 also passing around the fixed pulley 9 so that the edge wire 28 is looped around the two pulleys 8 and 9. The tension on the edge wire 28 governs the distance between the two pulleys 8 and 9, so that as soon as the tension becomes excessive the pulley wheel 8 is lifted, reducing the effect of the brake 3 and so reducing the tension of the edge wire 28.

The power required for pulling the edge wire 28 off the storage drum 1 is delivered by a drum 11, which is itself driven by a variable drive. From the pulley wheel 9 the edge wire 28 passes up and around an idler pulley 10 and then down and around the driving drum 11 and then up to the coil 25. The driving drum 11 is open at both ends. The lower part of the drum 11 dips into a liquid mixture 12 in a pan 14, the liquid mixture consisting of soldering metal powder suspended in a liquid flux. When the apparatus is in operation the soldering metal powder increases the friction between the edge wire 28 and the surface of the drum 11, giving better traction. On the other hand as soon as the tension on the edge wire 28 falls below a certain value, that is to say when the wire goes slack, the liquid flux provides a certain amount of lubrication, allowing the drum to slip and even if necessary allowing the wire to move backwards. The driving effect of the drum, that is to say the tension applied to the edge wire 28, can be influenced within limits by modifying the composition of the liquid mixture. On the other hand, to ensure that the composition of the mixture remains constant during a run, at least one agitator rod 13 is provided, projecting from an end wall of the drum, to prevent the metal powder from settling.

If desired the edge wire 28 can be given a turn and a half around the drum, or even more, instead of only half a turn, to increase the driving effect.

The control system described above allow the coated edge wire 27 to be fed to the coil 25 extremely gently, or even under a slight compressive stress, so that the coil 25 takes the edge wire 27 easily, even if the coil 25 consists of extremely thin and soft wire, and even if the coil has a comparatively great radial height.

In the operation of the machine it is necessary to ensure that the edge wire 27 is guided with precision on to the coil 25. For this purpose there is provided a wire guide consisting essentially of a rod 23 which has a forked end for guiding the wire. The rod 23 is adjustable in position parallel to the heat exchanger axis. The wire guide rod 23 extends perpendicular to the edge wire 27 and perpendicular to the axis of a supporting rod 19. The supporting rod 19 is mounted on the machine frame G by means of a bush 16 which engages with a pin 17 projecting upwards from the frame G. The bush 16 can be rotated by the operator on the pin 17 with a certain amount of friction, by means of a handle 18. The axis of the pin 17 is a tangent to the central pipe of the heat exchanger 25, the tangent touching the pipe on the opposite side compared to the feed of edge wire 27.

The supporting rod 19 is preferably connected to the bush 16 by a fairly stiff spring 15. For controlling the position of the wire guide rod 23 there is a feeler wire 22 stretched taut between the wire guide rod 23 and the inwardly bent upper end of the supporting rod 19. The feeler wire 22 extends between the webs of the coil 25, flexing axially as necessary to accommodate tolerances during axial movement and rotation of the coil. If the heat exchanger has a very close pitch helix the feeler wire 22 can yield by moving outwards. The distance between the feeler wire 22 and the spring 15 is great enough to ensure that the feeler wire can be shifted in position by the coil 25 by the application of extremely little thrust.

At the beginning of a winding operation, or after a temporary shut down of the winding machine, the edge wire 27 is resting tangentially against the surface of the central pipe of the heat exchanger. When the machine is started up, or when a new winding operation begins, the leading end of the heat exchanger coil comes into contact with the feeler wire 22, whereupon the first turn of the heat exchanger helix comes up from underneath against the edge wire 27, tending to lift it away from the surface of the central pipe. If the tension on the edge wire 27 is too great to allow the lifting off, the edge wire 27 yields by moving away towards the next web of the helix, until finally the edge wire 27 is lifted away and comes to rest on the outer edge of the helix. In this process the increased tension on the edge wire 27 increases the friction on the surface of the driving drum 11, which consequently feeds wire faster, reducing the wire tension or even applying a slight compressive thrust to the wire 27, facilitating the lifting of the wire 27 up onto the edge of the heat exchanger helix. Consequently any irregularities in structure are limited to a few turns at the beginning of the helix and hardly reduce the effectiveness of the heat exchanger.

In principle the same ready recovery should take place, in the course of manufacture, should the edge wire happen to slip off the outer edge of the helix. Although there is a negligible risk of this happening in practice, nevertheless tests have been made in which the edge wire was deliberately pushed off the edge of the helix. It was found that the edge wire was lifted back onto the edge of the helix after approximately half a turn of the helix.

This method of guiding the edge wire is preferable to the more obvious method by which the edge wire is guided by the helical coil itself, in that by the present method of guiding when there is no helix on the central pipe of the heat exchanger the edge wire is still guided to the correct position on the surface of the central pipe. A further advantage of the present method is that contact between the edge wire and guiding devices is minimised and consequently very little liquid mixture is wiped off the wire again.

Heat for soldering the coated wire to the edge of the heat exchanger helix, and for preheating the edge of the helix, is supplied by a heating device 20 which projects a blown gas flame 21 approximately tangentially onto the edge of the helix.

I claim:

1. In a method of manufacturing a heat exchanger by helically wrapping, about the outer surface of a carrier tube and with a prescribed pitch, at least one wire helix having a plurality of successive turns of relatively large radial extent, and rigidly securing the inner surfaces of the successive turns of the helix to the outer surface of the tube, an improved technique for reinforcing the resulting heat exchanger, which comprises the steps of:

rotating the tube on its axis and simultaneously advancing the tube by an amount corresponding to the pitch of the helix;

winding a separate support wire around the radially outer edge extremity of each of the turns of the spirally advancing helix under a constant selectable tension; and intimately securing the wound support wire to each of the associated adjacent outer edges of the turns of the helix.

* * * * *